(12) United States Patent
Cui et al.

(10) Patent No.: US 12,375,030 B2
(45) Date of Patent: Jul. 29, 2025

(54) FOLDABLE ADJUSTABLE PHOTOVOLTAIC MODULE

(71) Applicant: HUANENG JIANGSU COMPREHENSIVE ENERGY SERVICE CO., LTD., Nanjing (CN)

(72) Inventors: Lei Cui, Nanjing (CN); Xuliang Jiang, Nanjing (CN); Chenhui Niu, Nanjing (CN); Cheng Wang, Nanjing (CN); Feng Li, Nanjing (CN); Xi Guo, Nanjing (CN); Jie Yin, Nanjing (CN); Kenan Cao, Nanjing (CN)

(73) Assignee: HUANENG JIANGSU COMPREHENSIVE ENERGY SERVICE CO., LTD., Nanjing (CN)

( * ) Notice: Subject to any disclaimer, the term of this patent is extended or adjusted under 35 U.S.C. 154(b) by 519 days.

(21) Appl. No.: 17/873,079

(22) Filed: Jul. 25, 2022

(65) Prior Publication Data
US 2023/0387852 A1  Nov. 30, 2023

(30) Foreign Application Priority Data

May 26, 2022  (CN) .......................... 202210588355.1

(51) Int. Cl.
*H02S 30/20* (2014.01)
*F24S 30/00* (2018.01)
(Continued)

(52) U.S. Cl.
CPC .............. *H02S 30/20* (2014.12); *F24S 40/10* (2018.05); *H02S 20/30* (2014.12);
(Continued)

(58) Field of Classification Search
CPC ........... H02S 30/20; H02S 20/30; F24S 40/10
(Continued)

(56) References Cited

U.S. PATENT DOCUMENTS

| 2012/0285506 A1* | 11/2012 | Kuo ........................ H02S 20/00 |
| | | 136/246 |
| 2018/0306467 A1* | 10/2018 | Grant .................... F24S 25/617 |

(Continued)

FOREIGN PATENT DOCUMENTS

| CN | 203838565 U | * | 9/2014 |
| CN | 109525176 A | * | 3/2019 |
| CN | 113890472 A | * | 1/2022 |

*Primary Examiner* — Allen R. B. Schult
*Assistant Examiner* — William C Weinert
(74) *Attorney, Agent, or Firm* — IDEA Intellectual Limited; Sam T. Yip (57) ABSTRACT

A foldable adjustable photovoltaic module, comprising angle adjusting device, comprising adjusting component and basic photovoltaic panel on the adjusting component; and folding device, comprising first and second folding components, is provided. One end of the basic photovoltaic panel is installed with protective photovoltaic panel, and the first folding component is between the basic and the protective photovoltaic panels. Both sides of the basic and the protective photovoltaic panels are provided with side photovoltaic panels, and the second folding component connects the side photovoltaic panels, the basic photovoltaic panel and the protective photovoltaic panel. The module can control multiple photovoltaic panels for angle adjustment, so as to conveniently obtain the optimal illumination angle. Also, the foldable adjustable photovoltaic module controls folding of the photovoltaic panels, and reducing their contact area with the external environment in bad weather, so as to protect and prolong the lifetime of the photovoltaic panels.

12 Claims, 5 Drawing Sheets

(51) Int. Cl.
*F24S 40/10* (2018.01)
*H02S 20/30* (2014.01)

(52) U.S. Cl.
CPC .... *F24S 2030/133* (2018.05); *F24S 2030/135* (2018.05); *F24S 2030/14* (2018.05)

(58) Field of Classification Search
USPC ........................................................ 126/603
See application file for complete search history.

(56) References Cited

U.S. PATENT DOCUMENTS

2019/0379324 A1* 12/2019 Al-Haddad ............. F24S 20/50
2022/0140778 A1* 5/2022 Ellis ........................ H02S 40/38
                                                                                                         136/244
2023/0378903 A1* 11/2023 Choudhury ............. H02S 20/32

* cited by examiner

FOLDABLE ADJUSTABLE PHOTOVOLTAIC MODULE

FIELD OF THE INVENTION

The present disclosure relates to the field of photovoltaic technology, in particular to a foldable adjustable photovoltaic module.

BACKGROUND OF THE INVENTION

With the increasingly prominent energy crisis and environmental problems, the photovoltaic power generator technology is becoming more and more mature. The existing photovoltaic power stations are generally constructed in high places and other unsheltered locations, which can ensure the power generation. However, because these locations are not sheltered, they are greatly affected by the weather. The existing method is nothing more than increasing the material thickness of a photovoltaic bracket to increase the tolerance of photovoltaics to environmental factors, but the lifetime of photovoltaic modules will also be reduced. Some devices protect a single photovoltaic panel, but the cost is high. Therefore, the present disclosure provides a foldable adjustable photovoltaic module, which controls a large number of photovoltaic panels for angle adjustment, so as to conveniently obtain the optimal illumination angle. At the same time, the foldable adjustable photovoltaic module can control a plurality of photovoltaic panels to be folded, and their contact area with the external environment in bad weather is reduce, protecting the photovoltaic panels, and prolonging the lifetime of the photovoltaic panels.

SUMMARY OF THE INVENTION

The purpose of the summary is to summarize some aspects of the embodiments of the present disclosure and briefly introduce some preferred embodiments. Some simplifications or omissions may be made in this section, the abstract and the title of the present application to avoid obscuring the purpose of this section, the abstract and the title, and such simplifications or omissions cannot be used to limit the scope of the present disclosure.

In view of the above and/or existing problems in photovoltaic panels, the present disclosure has been proposed.

Therefore, the problem to be solved by the present disclosure lies in the need of a foldable adjustable photovoltaic module, which solves the problem that it is difficult to protect the existing photovoltaic panels in the external environment.

In order to solve the above technical problems, the present disclosure provides the following technical scheme: a foldable adjustable photovoltaic module, comprising: an angle adjusting device, comprising an adjusting component and a basic photovoltaic panel installed on the adjusting component; and a folding device, comprising a first folding component and second folding components. One end of the basic photovoltaic panel is installed with a protective photovoltaic panel, and the first folding component is installed between the basic photovoltaic panel and the protective photovoltaic panel. Both sides of the basic photovoltaic panel and the protective photovoltaic panel are provided with side photovoltaic panels, and the side photovoltaic panels are connected with the basic photovoltaic panel and the protective photovoltaic panel through the second folding components.

As a preferred scheme of the foldable adjustable photovoltaic module of the present disclosure, the adjusting component comprises a base, a photovoltaic mounting frame, a rotating bracket and a first motor. Sliding grooves are provided on both sides of the base. Thread shafts are installed in the sliding grooves. A slider is installed on the thread shaft. The thread shaft is in transmission connection with the first motor through a chain, and the thread shaft rotates to drive the slider to slide in the sliding groove.

As a preferred scheme of the foldable adjustable photovoltaic module of the present disclosure, both sides of one end of the photovoltaic mounting frame are rotatably connected with the slider. Both sides of one end of the rotating bracket are rotatably connected with one end of the base, and another end of the rotating bracket is rotatably connected with the middle of the photovoltaic mounting frame.

The hinge points of the slider that are connected to the rotating bracket and the base are located on different sides.

As a preferred scheme of the foldable adjustable photovoltaic module of the present disclosure, the first folding component comprises fixed brackets, telescopic gas cylinders and a connector. Two fixed brackets are provided which are installed on the back of the basic photovoltaic panel and the protective photovoltaic panel, respectively. Hinged joints which are hinged with each other are provided between the two fixed brackets. One side of the connector is provided with a joint, and the joint is hinged with the hinged joints.

As a preferred scheme of the foldable adjustable photovoltaic module of the present disclosure, the middle of the fixed bracket is provided with a gas cylinder mounting frame. Both sides of the joint are symmetrically provided with gas cylinder joints, and the end of the telescopic rod of the telescopic gas cylinder is hinged to the gas cylinder joints, and another end of the telescopic gas cylinder is hinged to the gas cylinder mounting frame, and the two telescopic gas cylinders keep the telescopic amounts synchronous.

As a preferred scheme of the foldable adjustable photovoltaic module of the present disclosure, the second folding component comprises connecting blocks, a clamping joint, a transmission rod and a transmission motor The second folding component is installed on both sides of the fixed bracket. The connecting blocks are fixedly installed at four corners of the fixed bracket. The connecting blocks installed on the connecting sides of the two fixed brackets are hinged with each other. One side of the connecting block is further provided with a transmission rod installation hole. Both ends of the transmission rod are installed in the transmission rod installation holes, respectively, and the axial direction of the transmission rod is parallel to the side of the photovoltaic panel.

As a preferred scheme of the foldable adjustable photovoltaic module of the present disclosure, a side fixed frame is fixedly installed on the transmission rod, and the side photovoltaic panel is fixedly installed on the side fixed frame.

As a preferred scheme of the foldable adjustable photovoltaic module of the present disclosure, the middle of the clamping joint is in the shape of a disc. One side of the disc is provided with a shaft and is concentrically and fixedly connected with the transmission rod, and the clamping joints are all located on the side where the fixed brackets are connected with each other.

The other side of the disc is provided with several telescopic joints, the telescopic joints are uniformly distributed around a circumference. A distance between two adjacent telescopic joints is the same as a diameter of the telescopic joints, and the telescopic joints on the two clamping joints are matched with each other when the basic photovoltaic panel and the protective photovoltaic panel are located on the same plane.

As a preferred scheme of the foldable adjustable photovoltaic module of the present disclosure, the transmission motor is fixedly installed on the fixed bracket connected with the basic photovoltaic panel, and a motor shaft of the transmission motor is coaxially and fixedly connected with the transmission rod on the basic photovoltaic panel.

As a preferred scheme of the foldable adjustable photovoltaic module of the present disclosure, a protective shell is fixedly installed on the back of the protective photovoltaic panel.

The present disclosure has the following beneficial effect. The present disclosure provides a foldable adjustable photovoltaic module, which controls a large number of photovoltaic panels for angle adjustment, so as to conveniently obtain the optimal illumination angle. At the same time, the foldable adjustable photovoltaic module can control a plurality of photovoltaic panels to be folded, reducing their contact area with the external environment in bad weather, protecting the photovoltaic panels, and prolonging the lifetime of the photovoltaic panels.

BRIEF DESCRIPTION OF DRAWINGS

In order to explain the technical scheme of the embodiments of the present disclosure more clearly, the drawings that need to be used in the description of the embodiments will be briefly introduced hereinafter. Obviously, the drawings in the following description are merely some embodiments of the present disclosure. For those skilled in the art, other drawings can be obtained according to these drawings without paying creative labor, in which.

DETAILED DESCRIPTION OF THE INVENTION

In order to make the above objects, features and advantages of the present disclosure more obvious and understandable, the detailed description of the specific embodiments of the present disclosure will be made with reference to the accompanying drawings hereinafter.

In the following description, many specific details are set forth in order to fully understand the present disclosure, but the present disclosure can be implemented in other ways different from those described here. Those skilled in the art can make similar promotion without departing from the connotation of the present disclosure. Therefore, the present disclosure is not limited by the specific embodiments disclosed hereinafter.

Second, the term "one embodiment" or "an embodiment" here refers to a specific feature, structure or characteristic that can be included in at least one implementation of the present disclosure. The term "in one embodiment" appearing in different places in this specification does not all refer to the same embodiment or separate or selective embodiments mutually exclusive of other embodiments.

Embodiment 1

Figure 1:
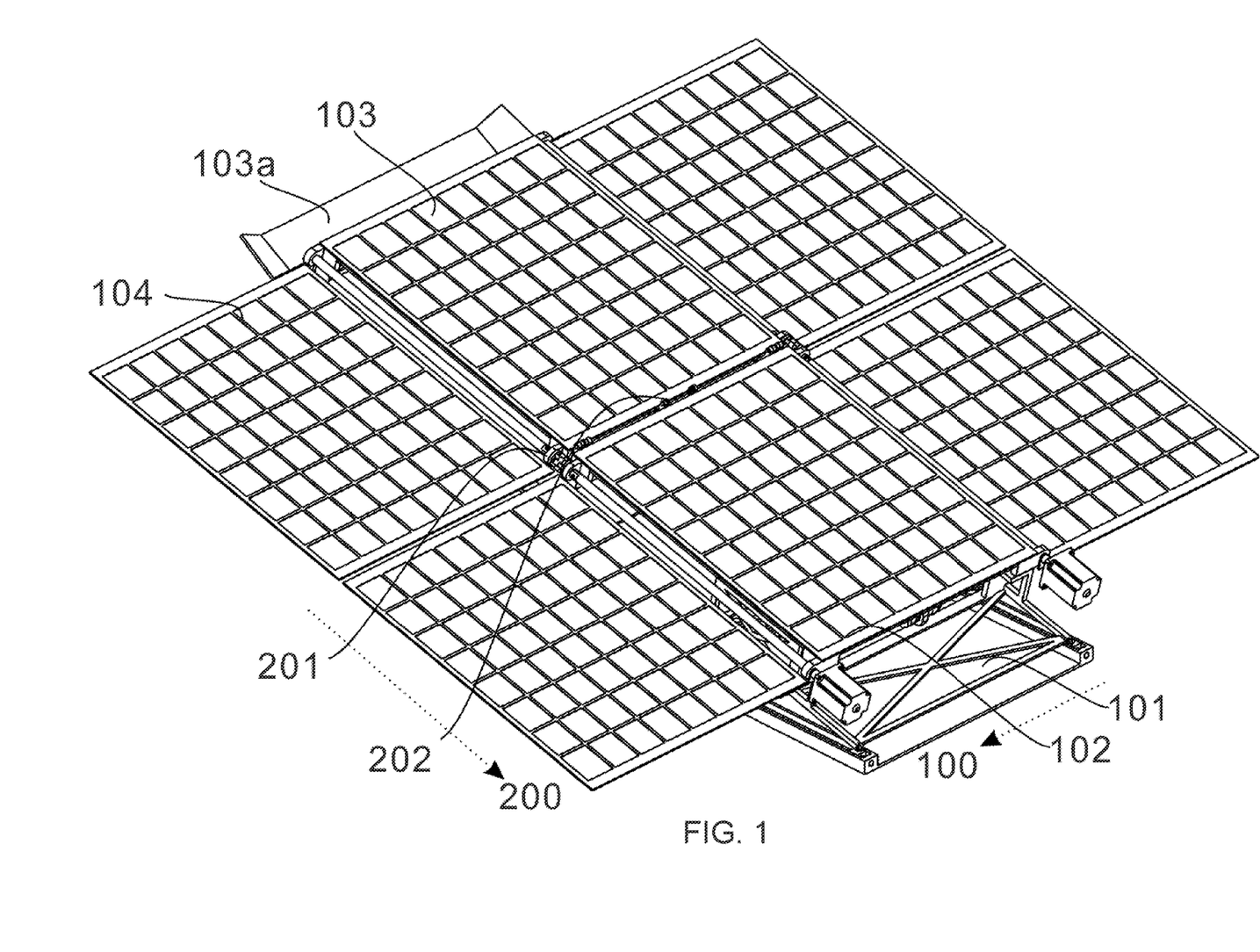
FIG. 1 is the overall assembly schematic diagram of a foldable adjustable photovoltaic module.
Figure 2:
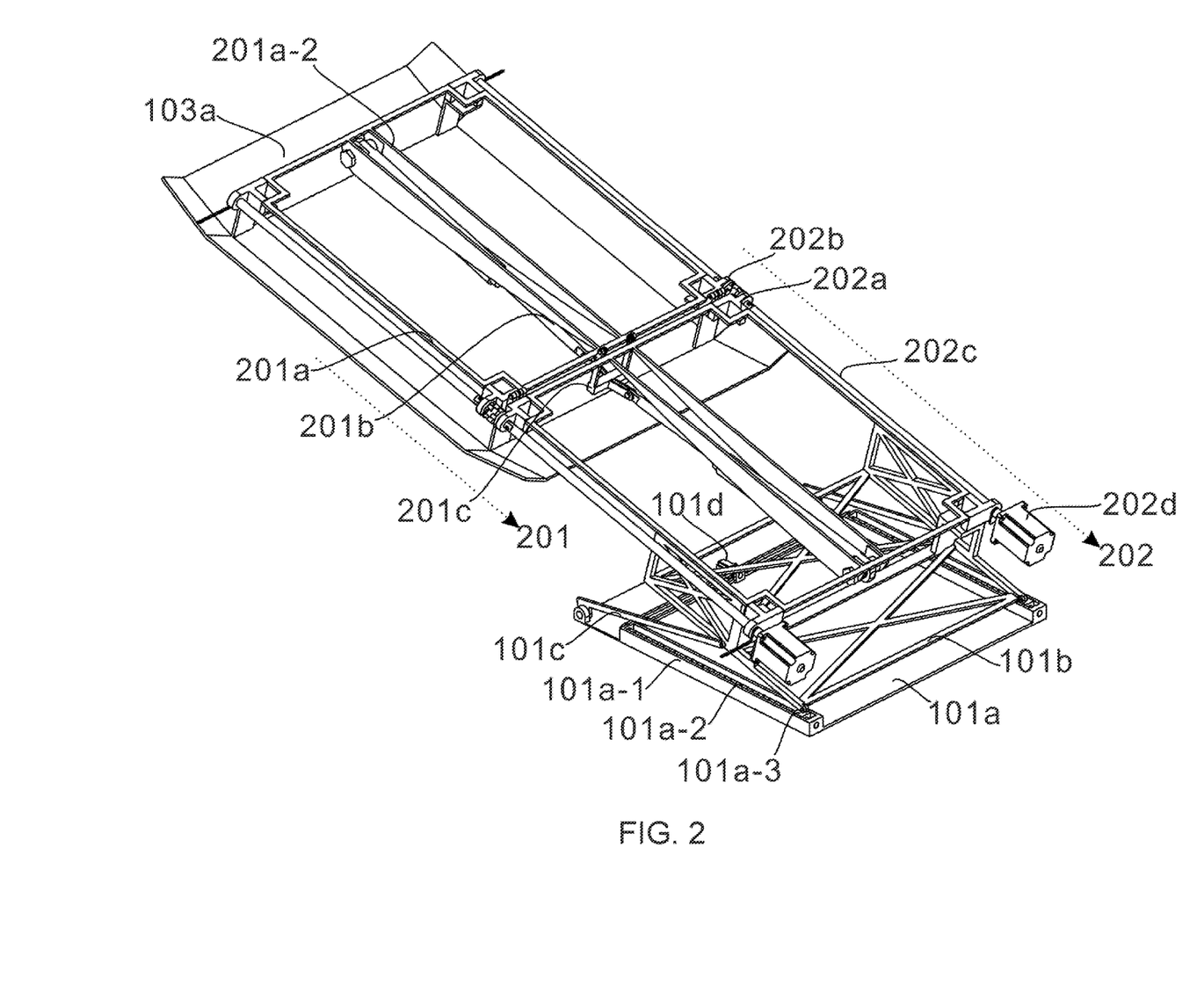
FIG. 2 is a partial structure diagram of a foldable adjustable photovoltaic module.

Referring to FIGS. 1 and 2, this embodiment is a first embodiment of the present disclosure. A foldable adjustable photovoltaic module is provided, which comprises an angle adjusting device 100 for adjusting the inclined angle, and a folding device 200 connected with the angle adjusting device 100 and capable of being folded.

The angle adjusting device 100 comprises an adjusting component 101, a basic photovoltaic panel 102 installed on the adjusting component 101; the folding device 200 comprises a first folding component 201 and second folding components 202. One end of the basic photovoltaic panel 102 is installed with a protective photovoltaic panel 103, and the first folding component 201 is installed between the basic photovoltaic panel 102 and the protective photovoltaic panel 103. Both sides of the basic photovoltaic panel 102 and the protective photovoltaic panel 103 are provided with side photovoltaic panels 104, and the sides photovoltaic panels 104 are connected to the basic photovoltaic panel 102 and the protective photovoltaic panel 103 through the second folding components 202. The basic photovoltaic panel 102, the protective photovoltaic panel 103 and the side photovoltaic panels 104 are all the same in size and shape.

Specifically, the adjusting component 101 comprises a base 101a, a photovoltaic mounting frame 101b, a rotating bracket 101c and a first motor 101d. Sliding grooves 101a-1 are provided on both sides of the base 101a. Thread shafts 101a-2 are installed in the sliding grooves 101a-1. A slider 101a-3 is installed on the thread shaft 101a-2. The thread shaft 101a-2 is in transmission connection with the first motor 101d through a chain. The thread shaft 101a-2 rotates to drive the slider 101a-3 to slide in the sliding groove 101a-1. The middle of the slider 101a-3 is provided with a threaded hole. When the thread shaft 101a-2 rotates, the slider 101a-3 will slide in the sliding groove 101a-1 under the limiting effect of the sliding groove 101a-1. Two thread shafts 101a-2 are driven by a motor through chain transmission, so that the two thread shafts 101a-2 rotate synchronously. The slider 101a-3 rotates synchronously. The lifting actions of both sides of the photovoltaic mounting frame 101b are the same, so as to prevent the photovoltaic mounting frame from being stuck.

Further, both sides of one end of the photovoltaic mounting frame 101b are rotatably connected with the slider 101a-3. Both sides of one end of the rotating bracket 101c are rotatably connected with one end of the base 101a, and the other end of the rotating bracket 101c is rotatably connected with the middle of the photovoltaic mounting frame 101b. The hinge points of the slider 101a-3 that are connected to the rotating bracket 101c and the base 101a are located on different sides. In the actual implementation process, the length of the sliding groove 101a-1 needs to be adjusted, so that the photovoltaic mounting frame 101b still forms a certain included angle with the base 101a in the flat state. That is, a triangle is always formed among the base 101a, the photovoltaic mounting frame 101b and the rotating bracket 101c, so as to prevent the photovoltaic mounting frame 101b from being stuck by the rotating bracket 101c.

In this embodiment, according to different installation and use scenarios, a rotating device can be installed under the base 101a, and is connected with the relevant control system, so that the whole device can adjust its orientation according to the illumination, and realize the real-time tracking of sunlight.

Embodiment 2

Referring to FIGS. 1-5, this embodiment is a second embodiment of the present disclosure, which is based on the previous embodiment, and further comprises the specific implementation of a first folding component 201 and a second folding component 202.

Specifically, the first folding component 201 comprises fixed brackets 201a, telescopic gas cylinders 201b and a connector 201c. Two fixed brackets 201a are provided which are installed on the back of the basic photovoltaic panel 102 and the protective photovoltaic panel 103, respectively. Hinged joints 201a-1 which are hinged with each other are provided between the two fixed brackets 201a. One side of the connector 201c is provided with a joint 201c-1, and the joint 201c-1 is hinged with the hinged joints 201a-1. The fixed bracket 201a is attached to the frame of the photovoltaic panel. The hinge joint 201a-1 is provided in the middle of the fixed bracket 201a. The hinged fixed bracket 201a can be folded, and, after folding and the basic photovoltaic panel 102 is parallel to the protective photovoltaic panel 103, the front faces of the two photovoltaic panels are facing each other. Moreover, there is still a large gap between the basic photovoltaic panel 102 and the protective photovoltaic panel 103.

Further, the middle of the fixed bracket 201a is provided with a gas cylinder mounting frame 201a-2. Both sides of the joint 201c-1 are symmetrically provided with gas cylinder joints 201c-2. The end of the telescopic rod of the telescopic gas cylinder 201b is hinged to the gas cylinder joints 201c-2, and the other end of the telescopic gas cylinder 201b is hinged to the gas cylinder mounting frame 201a-2. The two telescopic gas cylinders 201b keep the telescopic amounts synchronous. When the gas cylinder is controlled to extend and retract, the protective photovoltaic panel 103 can be controlled to be automatically folded or unfolded under the action of the connector 201c.

In addition, the second folding component 202 comprises connecting blocks 202a, a clamping joint 202b, a transmission rod 202c and a transmission motor 202d. The second folding component 202 is installed on both sides of the fixed bracket 201a. The connecting blocks 202a are fixedly installed at four corners of the fixed bracket 201a. The connecting blocks 202a installed on the connecting sides of the two fixed brackets 201a are hinged with each other. One side of the connecting block 202a is further provided with a transmission rod installation hole 202a-1. Both ends of the transmission rod 202c are installed in the transmission rod installation holes 202a-1, respectively, and the axial direction of the transmission rod 202c is parallel to the side of the photovoltaic panel.

Further, a side fixed frame 202c-1 is fixedly installed on the transmission rod 202c, and the side photovoltaic panel 104 is fixedly installed on the side fixed frame 202c-1. The side fixed frame 202c-1 are L-shaped. The side fixed frame 202c-1 on both sides have the same shape, but different sizes, so that the side photovoltaic panels 104 can be overlapped when folded. The transmission motor 202d is fixedly installed on the fixed bracket 201a connected to the basic photovoltaic panel 102, and the motor shaft of the transmission motor 202d is coaxially and fixedly connected with the transmission rod 202c on the basic photovoltaic panel 102.

Still further, the middle of the clamping joint 202b is in the shape of a disc. One side of the disc is provided with a shaft and is concentrically and fixedly connected with the transmission rod 202c. The clamping joints 202b are all located on the side where the fixed brackets 201a are connected with each other. The other side of the disc is provided with several telescopic joints 202b-1. The telescopic joints 202b-1 are uniformly distributed around a circumference. The distance between two adjacent telescopic joints 202b-1 is the same as the diameter of the telescopic joint 202b-1. The telescopic joints 202b-1 on two clamping joints 202b are matched with each other when the basic photovoltaic panel 102 and the protective photovoltaic panel 103 are located on the same plane. When the basic photovoltaic panel 102 and the protective photovoltaic panel 103 are in the folded state, the two clamping joints 202b are completely separated.

Figure 3:
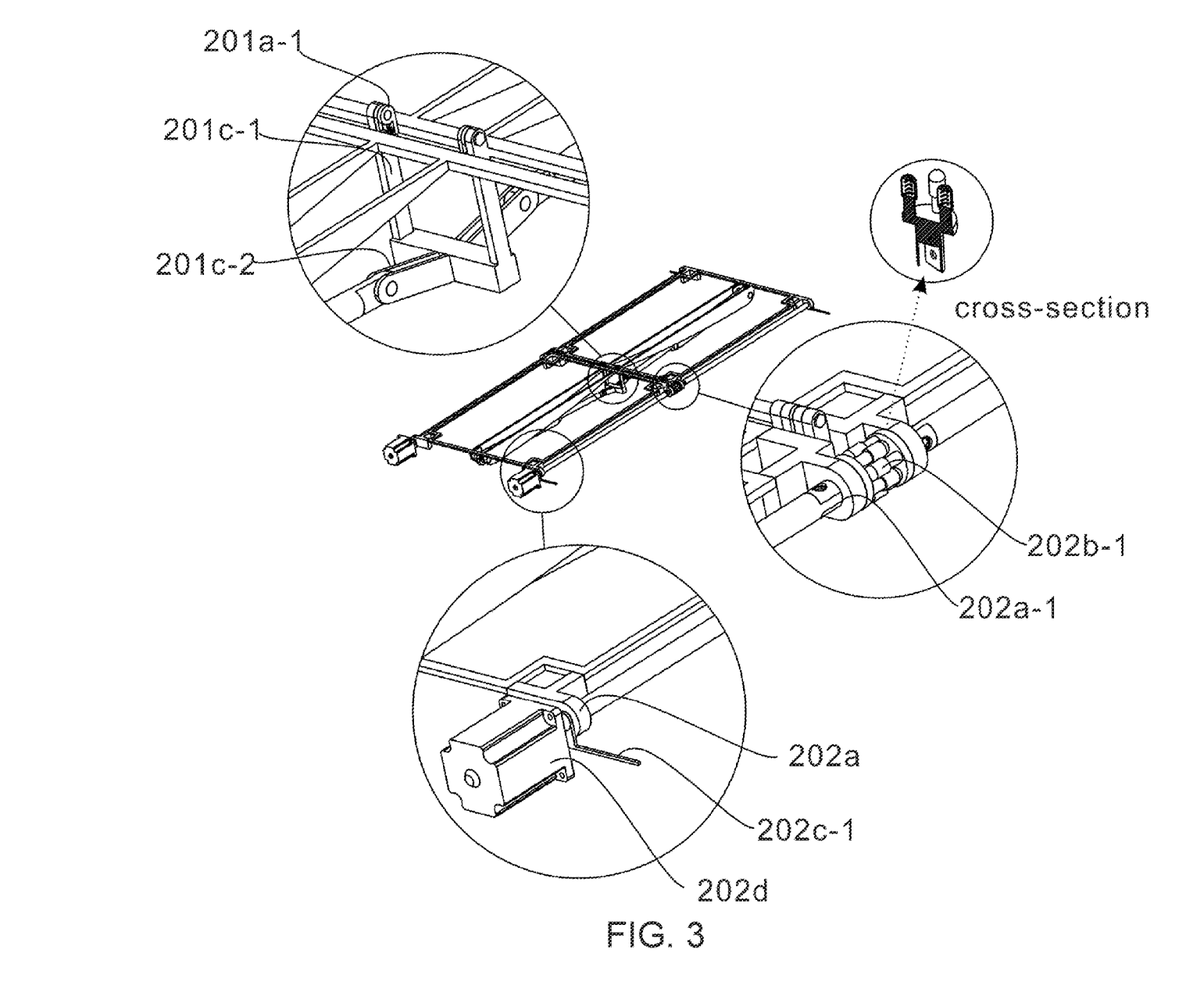
FIG. 3 is a detailed structural diagram of each part of a foldable adjustable photovoltaic module.

The telescopic joint 202b-1 comprises a connecting column, an elastic member, and a telescopic cap. The connecting column is fixedly connected with the disc in the middle of the clamping joint. The telescopic cap is hollow and sleeved on the connecting column. The elastic member is a compression spring, and the elastic member is installed in the telescopic cap, and the elastic member connects the connecting column and the telescopic cap.

Figure 4:
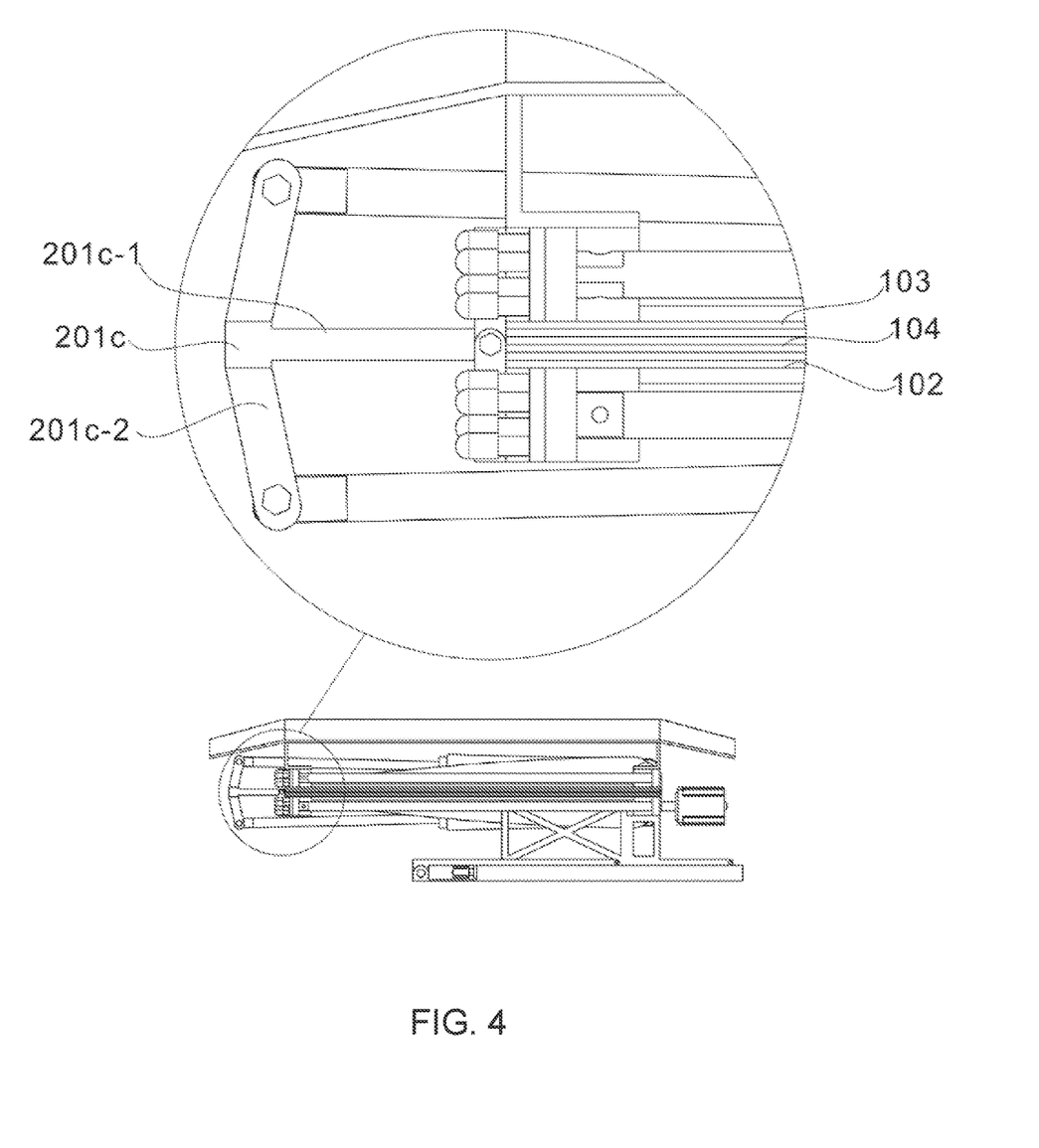
FIG. 4 is a diagram of the folded structure of a foldable adjustable photovoltaic module.

In addition, a protective shell 103a is fixedly installed on the back of the protective photovoltaic panel 103. The protective shell 103a is made of corrosion-resistant and strong material. When the protective photovoltaic panel 103 is folded to be parallel to the basic photovoltaic panel 102, the protective shell 103a is located above the whole device to shield and protect the whole device. In order not to affect the movement of other components, there is a large distance between the protective shell 103a and the protective photovoltaic panel 103. The side of the protective shell 103a is provided as an inclined surface, which is convenient for sundries or rainwater to slide down. According to different inclined angles, in the optimal case, when all photovoltaic panels are unfolded, the side of the protective shell 103a can also support the back of the side photovoltaic panels 104, thus increasing the stability of the whole device.

Figure 5:
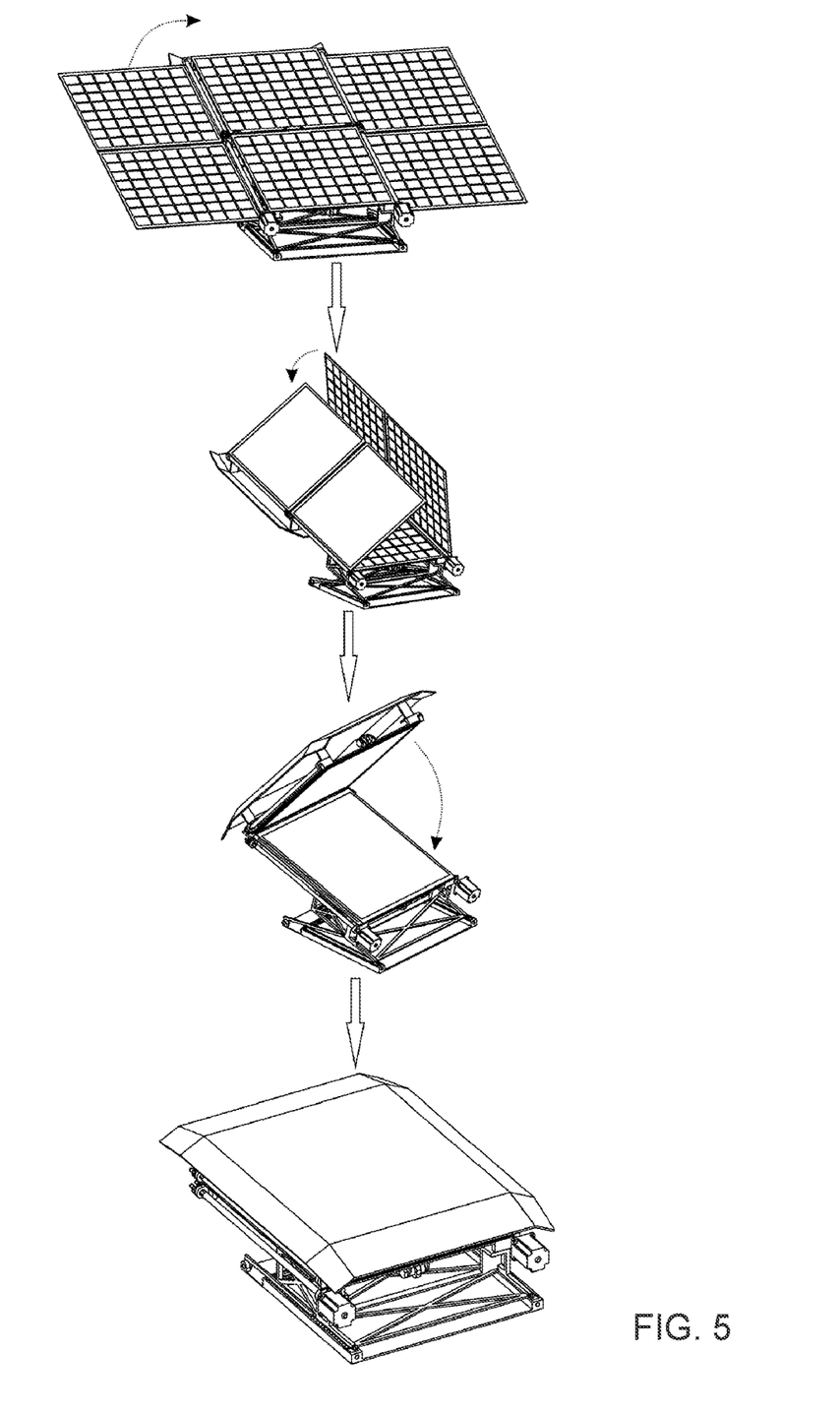
FIG. 5 is an action flow chart of a foldable adjustable photovoltaic module.

In this embodiment, the action process of the present disclosure changing from the fully unfolded state to the fully folded state is as follows: two transmission motors 202d are controlled successively to fold the side photovoltaic panels 104 at both sides of the basic photovoltaic panel 102 and the protective photovoltaic panel 103. With the function of the clamping joint 202b, the side photovoltaic panels 104 on the same side can rotate synchronously. When the side photovoltaic panels 104 are folded to be parallel to the basic photovoltaic panel 102, the motor stops operating and then the telescopic gas cylinders 201b are controlled to operate. The two telescopic gas cylinders extend at the same time. At this time, the protective photovoltaic panel 103 starts to be folded towards the base photovoltaic panel 102 until the protective photovoltaic panel 103 is parallel to the base photovoltaic panel 102.

Importantly, it should be noted that the configuration and arrangement of the present application shown in a plurality of different exemplary embodiments are only illustrative. Although only a few embodiments are described in detail in the present disclosure, those who refer to the present disclosure should easily understand that many modifications are possible (e.g., changes in the size, scale, structure, shape and proportion of various elements, and parameter values (e.g., temperature, pressure, etc.), installation arrangement, use of materials, color, orientation, etc.) without substantially departing from the novel teachings and advantages of the subject matter described in the present application. For example, an element shown as being integrally formed may consist of a plurality of parts or elements, the position of the element may be inverted or otherwise changed, and the nature or number or position of discrete elements may be altered or changed. Therefore, all such modifications are intended to be included within the scope of the present disclosure. The order or sequence of any process or method steps may be changed or reordered according to alternative embodiments. In the claims, any terms of "device plus function" are intended to cover the structures described herein that perform the described functions, and are not only structurally equivalent but also equivalent structures. Other substitutions, modifications, changes and omissions can be made in the design, operating conditions and arrangement of the exemplary embodiments without departing from the scope of the present disclosure. Therefore, the present disclosure is not limited to a specific embodiment, but extends to various modifications that still fall within the scope of the appended claims.

In addition, in order to provide a concise description of the exemplary embodiment, all features of the actual embodiment may not be described (i.e., those features that are not related to the currently considered best mode of carrying out the present disclosure, or those features that are not related to the implementation of the present disclosure).

It should be understood that during the development of any actual implementation, such as in any engineering or design project, a large number of specific implementation decisions can be made. Such a development effort may be complicated and time-consuming, but for those skilled in the art who benefit from the present disclosure, the development effort will be a routine work of design, manufacture and production without excessive experiments.

It should be noted that the above embodiments are only used to illustrate the technical scheme of the present disclosure, rather than limit the technical scheme. Although the present disclosure has been described in detail with reference to the preferred embodiments, those skilled in the art should understand that the technical scheme of the present disclosure can be modified or equivalently replaced without departing from the spirit and scope of the technical scheme of the present disclosure, which should be covered in the scope of claims of the present disclosure.

The invention claimed is:

1. A foldable adjustable photovoltaic module, comprising:
   an angle adjusting device, comprising an adjusting component and a basic photovoltaic panel installed on the adjusting component; and
   a folding device, comprising a first folding component and second folding components;
   wherein one end of the basic photovoltaic panel is installed with a protective photovoltaic panel, and the first folding component is installed between the basic photovoltaic panel and the protective photovoltaic panel;
   wherein both sides of the basic photovoltaic panel and the protective photovoltaic panel are installed with side photovoltaic panels, and the side photovoltaic panels are connected to the basic photovoltaic panel and the protective photovoltaic panel through the second folding components;
   wherein the adjusting component comprises a base, a photovoltaic mounting frame, a rotating bracket and a first motor, and sliding grooves are provided on both sides of the base, and threaded shafts are installed in the sliding grooves, and a slider is installed on the threaded shaft, and the threaded shaft is in transmission connection with the first motor through a chain, and the threaded shaft rotates to drive the slider to slide in the sliding groove;
   wherein both sides of one end of the photovoltaic mounting frame are rotatably connected to the sliders, and both sides of one end of the rotating bracket are rotatably connected to one end of the base, and another end of the rotating bracket is rotatably connected to a middle of the photovoltaic mounting frame; wherein hinge points of the slider that are connected to the rotating bracket and the base are located on different sides; and
   wherein the first folding component comprises fixed brackets, telescopic gas cylinders and a connector, and two fixed brackets are provided which are installed on backs of the basic photovoltaic panel and the protective photovoltaic panel, respectively, and hinged joints which are hinged with each other are provided between the two fixed brackets, and one side of the connector is provided with a joint, and the joint is hinged with the hinged joints.

2. The foldable adjustable photovoltaic module according to claim 1, wherein a middle of the fixed bracket is provided with a gas cylinder mounting frame, and both sides of the joint are symmetrically provided with gas cylinder joints, and an end of a telescopic rod of the telescopic gas cylinder is hinged to the gas cylinder joints, and another end of the telescopic gas cylinder is hinged to the gas cylinder mounting frame, and the two telescopic gas cylinders keep the telescopic amounts synchronous.

3. The foldable adjustable photovoltaic module according to claim 2, wherein the second folding component comprises connecting blocks, a clamping joint, a transmission rod and a transmission motor, and the second folding component is installed on both sides of the fixed bracket, and the connecting blocks are fixedly installed at four corners of the fixed bracket, and the connecting blocks installed on the connecting sides of the two fixed brackets are hinged with each other, and one side of the connecting block is further provided with a transmission rod installation hole, and both ends of the transmission rod are installed in the transmission rod installation holes, respectively, and the axial direction of the transmission rod is parallel to the side of the photovoltaic panel.

4. The foldable adjustable photovoltaic module according to claim 2, wherein a protective shell is fixedly installed on the back of the protective photovoltaic panel.

5. The foldable adjustable photovoltaic module according to claim 3, wherein a side fixed frame is fixedly installed on the transmission rod, and the side photovoltaic panel is fixedly installed on the side fixed frame.

6. The foldable adjustable photovoltaic module according to claim 3, wherein a protective shell is fixedly installed on the back of the protective photovoltaic panel.

7. The foldable adjustable photovoltaic module according to claim 5, wherein a middle of the clamping joint is in the shape of a disc, and one side of the disc is provided with a shaft and is concentrically and fixedly connected with the transmission rod, and the clamping joints are all located on the side where the fixed brackets are connected with each other; wherein the other side of the disc is provided with several telescopic joints, and the telescopic joints are uniformly distributed around a circumference, and a distance between two adjacent telescopic joints is the same as a diameter of the telescopic joint, and the telescopic joints on the two clamping joints are matched with each other when the basic photovoltaic panel and the protective photovoltaic panel are located on the same plane.

8. The foldable adjustable photovoltaic module according to claim 5, wherein a protective shell is fixedly installed on the back of the protective photovoltaic panel.

9. The foldable adjustable photovoltaic module according to claim 7, wherein the transmission motor is fixedly installed on the fixed bracket connected with the basic photovoltaic panel, and a motor shaft of the transmission motor is coaxially and fixedly connected with the transmission rod on the basic photovoltaic panel.

10. The foldable adjustable photovoltaic module according to claim 7, wherein a protective shell is fixedly installed on the back of the protective photovoltaic panel.

11. The foldable adjustable photovoltaic module according to claim 9, wherein a protective shell is fixedly installed on the back of the protective photovoltaic panel.

12. The foldable adjustable photovoltaic module according to claim 1, wherein a protective shell is fixedly installed on a back of the protective photovoltaic panel.

\* \* \* \* \*